June 11, 1957  L. R. LOWRY, JR., ET AL  2,795,679
CONTROL APPARATUS

Filed Oct. 30, 1953  2 Sheets-Sheet 1

INVENTORS
Lewis R. Lowry, Jr. &
Harrison H. C. Richards, Jr.
BY
Ezra W. Savage
ATTORNEY June 11, 1957 L. R. LOWRY, JR., ET AL 2,795,679
CONTROL APPARATUS
Filed Oct. 30, 1953 2 Sheets-Sheet 2

United States Patent Office 2,795,679
Patented June 11, 1957

2,795,679

CONTROL APPARATUS

Lewis R. Lowry, Jr., and Harrison H. C. Richards, Jr., Lima, Ohio, assignors to Westinghouse Electric Corporation, East Pittsburgh, Pa., a corporation of Pennsylvania Application October 30, 1953, Serial No. 389,434

6 Claims. (Cl. 201—51)

This invention relates to magnetic devices and more particularly to means for varying the reluctance of a magnetic path within the magnetic device.

For instance, in carbon pile regulators, it is desirable to be able to vary the reluctance of the magnetic path of the electromagnet in order to vary the position of the force curve of the electromagnet. By properly positioning the force curve of the electromagnet, a proper differential regulating force can be obtained for the pile regulator.

Heretofore, the force curve for the electromagnet has been positioned by varying the position of the core member of the electromagnet with respect to its armature. However, this prior art means for varying the position of the electromagnet's force curve has several disadvantages. For instance, large diameter screw threads are provided on the core member in order to render it adjustable. Such large diameter screw threads are difficult to accurately produce. In addition, the adjustment of the core member with respect to the armature of the electromagnet is a sensitive means for varying the reluctance of the magnetic path of the electromagnet. That is, a slight adjustment of the position of the core member with respect to the armature member effects a relatively large increase in the output voltage of the generator with which the carbon pile regulator is associated. Further, no means is provided in these prior art pile regulators to positively maintain the core member in fixed relationship to the armature member without first disturbing the previous setting of the core member.

An object of this invention is to provide for varying the reluctance of the magnetic circuit of a magnetic device.

A more specific object of this invention is to provide less sensitive means for varying the reluctance of a magnetic circuit of an electromagnet incorporated in a pile regulator, by varying the width of the air gap between a flux control member and a recess disposed in the yoke of the electromagnet and by so constructing the yoke as to provide a restricted section, adjacent the air gap, which saturates when the flux density in the restricted section reaches a predetermined value, to thereby determine the proportion of the total flux that flows across the air gap for a given magnetomotive force and thus the effectiveness of varying the position of the flux control member relative to the recess in the yoke.

Another object of this invention is to provide for effectively locking the adjustable means, which is utilized to vary the reluctance of the magnetic circuit of the magnetic device, without disturbing its setting.

Other objects of this invention will become apparent from the following description when taken in conjunction with the accompanying drawings, in which.

Figure 1:
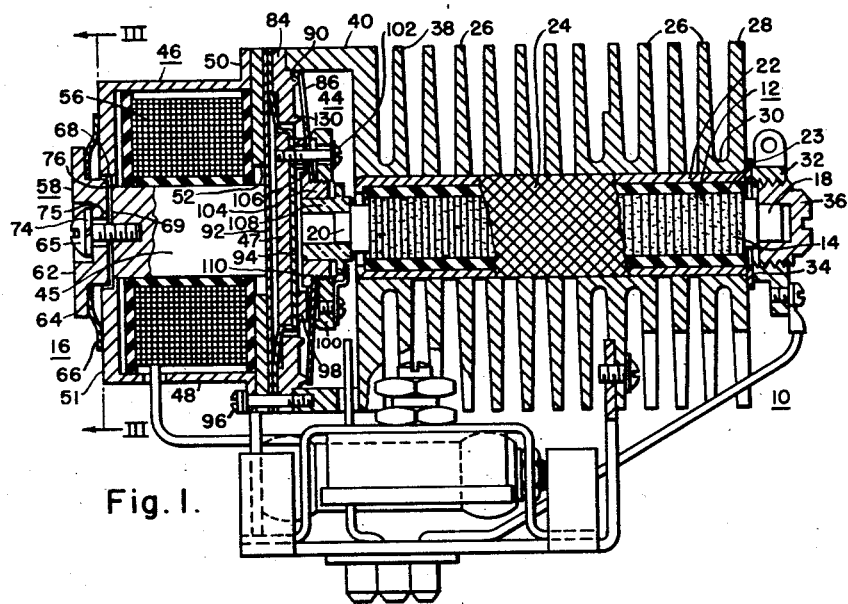
Figure 1 is an elevational view, partly in section, of a pile regulator embodying the teachings of this invention.
Figure 2:
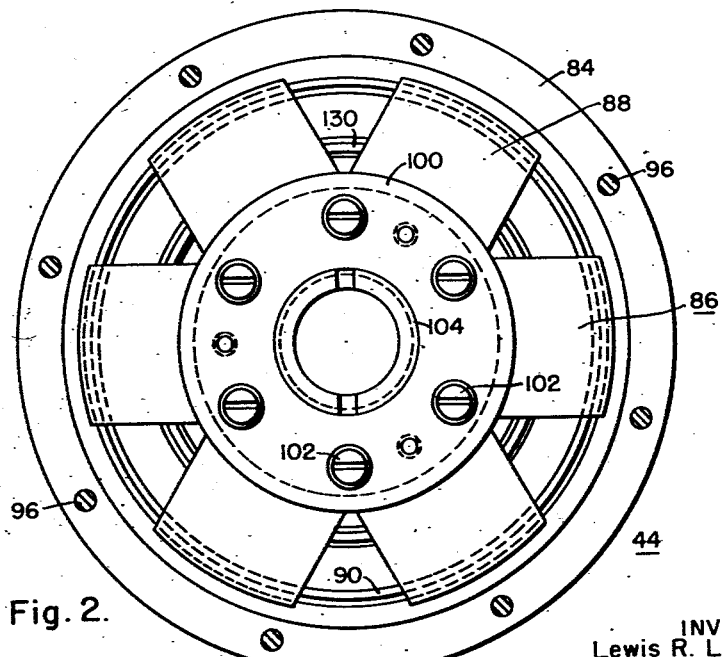
Fig. 2 is an enlarged plan view of the armature and spring assembly of the regulator of Fig. 1.

Referring to Fig. 1 of the drawings, this invention is illustrated by reference to a carbon pile regulator 10 comprising a stack 12, which includes a plurality of discs 14 constructed of resistance material, such as carbon, and an electromagnet 16 disposed to control the pressure applied to the stack 12, in accordance with the magnitude of an electrical quantity. However, it is to be understood that although a particular type of carbon pile regulator has been illustrated, this invention applies to all types of pile regulators, as well as to all types of magnetic devices.

In the particular carbon pile regulator 10 illustrated, the stack 12 is disposed between a relatively fixed pressure member or plate 18 and a movable pressure plate 20, the stack 12 being encased in a metallic tubular housing 22. As illustrated, a tube 23 of insulating material is disposed between the stack 12 and the housing 22, however, the discs 14 of the stack 12 are free to move within the tube 23. In this instance, the housing 22 is provided with an outer surface 24 which is roughened as by knurling or otherwise has ribs or grooves formed thereon to aid in securing a plurality of cooling fins 26 thereto. The cooling fins 26 are preferably constructed of aluminum and are disposed about the housing 22 in spaced relation lengthwise of the housing 22 for dissipating heat which is developed in the stack 12 by the current flow therethrough during the operation of the pile regulator 10.

As a general rule, the cooling fins 26 are independently mounted, depending upon their interlocking relation with the outer surface 24 of the housing 22 for maintaining them in operative position on the housing 22. However, as illustrated, a terminal fin 28 disposed at the end of the stack 12 and adjacent the fixed pressure plate 18 is joined to the adjacent fin 26 by a common hub 30 which strengthens the support of these fins on the housing 22.

In this instance, an end plate 32 is suitably mounted to the terminal fin 28, a washer 34 of insulating material being disposed between the end plate 32 and the terminal fin 28. A stack adjusting screw 36 is disposed in threaded engagement with the end plate 32 for receiving the pressure plate 18 and for making an initial adjustment of the pressure on the stack 12, which will be explained more fully hereinafter.

Referring to the opposite end of the stack 12, a terminal fin 38 is connected to a section 40 of a sectionalized housing for the electromagnet 16, in order to provide a strong support for the section 40 of the sectionalized housing. The section 40 in this instance is cup-shaped and substantially encloses an armature and spring assembly 44.

As illustrated, the electromagnet 16 comprises a core member 45, an armature member 47, and a magnetic housing or yoke 46 including a side wall member 48 having an outwardly extending flange 50, a base member 51, and an end pole piece 52. An energizing winding 56 is disposed within the magnetic housing 46 and in inductive relationship with the core member 45, the winding 56 being suitably insulated from the magnetic housing 46 and the core member 45.

In accordance with the teachings of this invention, mechanical means 58 is provided for controlling the reluctance of the magnetic circuit of the electromagnet 16 for a given positioning of the armature member 47. In this instance the magnetic circuit includes the core member 45, the yoke 46, and the armature member 47 of the electromagnet 16. As will be explained more fully hereinafter by providing the mechanical means 58, a proper differential regulating force can be readily obtained for the carbon pile regulator 10.

In the embodiment of Fig. 1, the mechanical means 58 comprises a cylindrical-shaped flux control member 62 having an outwardly extending flange 64 on one end thereof, a right-hand screw member 65, and a star-shaped spring-biasing member 66. However, it is to be understood that other suitable spring-biasing members could be substituted for the member 66. A cylindrical-shaped recess 68, having a surface 69 normal to the axis of the core member 45, is disposed in the yoke 46 for receiving the flux control member 62. In this instance, the spring-biasing member 66 is disposed between the flange 64 of the flux control member 62 and the base member 51 of the yoke 46. When so positioned, the spring-biasing member 66 biases the flux control member 62 against the head of the screw member 65, to thereby establish an air gap between the flux control member 62 and the surface 69 of the recess 68 and prevent a rotation of the flux control member 62 with respect to the yoke 46 of the electromagnet 16, during the operation of the regulator 10. Thus, since the flux control member does not rotate, the air gap between the flux control member 62 and the surface 69 remains at a fixed value. In particular, the friction engagement of the spring-biasing member 66 with the flange 64 and the frictional engagement of the spring-biasing member 66 with the yoke 46, prevents a rotation of the flux control member 62 with respect to the yoke 46. In order to further insure that the air gap between the flux control member 62 and the surface 69 of the recess 68 remains at a fixed value during the operation of the pile regulator 10, a lock washer 74 is disposed between the flux control member 62 and the head of the screw 65.

As illustrated, the screw member 65 is disposed in a passageway 75 that extends axially through the flux control member 62, the screw member 65 being threadedly engaged in the yoke 46 and core member 45 of the electromagnet 16. By adjusting the screw member 65 the width of the air gap between the flux control member 62 and the surface 69 of the recess 68 can be varied. In particular, by turning the screw member 65 counterclockwise, the width of the air gap between the flux control member 62 and the surface 69 of the recess 68 is increased, to thereby increase the reluctance of the magnetic circuit of the electromagnet 16 for a given position of the armature member 47. On the other hand, by turning the screw member 65 clockwise, so as to decrease the width of the air gap between the flux control member 62 and the surface 69 of the recess 68, the reluctance of the magnetic circuit of the electromagnet 16 is decreased. Thus, by providing the spring-biasing member 66 and the screw member 65, the position of the flux control member 62, with respect to the surface 69 of the recess 68, can be varied.

For the purpose of forcing the magnetic flux, during the operation of the pile regulator 10, across the air gap between the flux control member 62 and the surface 69 of the recess 68, the yoke 46 is provided with a restricted section 76. As illustrated, the restricted section 76 is adjacent the air gap between the flux control member 62 and the surface 69 of the recess 68. In the operation of the carbon pile regulator 10, the restricted section 76 saturates when the flux density in the restricted section 76 reaches a predetermined value, to thereby determine the proportion of the total flux that passes across the air gap disposed between the flux control member 62 and the surface 69 of the recess 68 for a given magnetomotive force as effected by the current flow through the winding 56 of the electromagnet 16. In practice, the thinner the restricted section 76, the more sensitive is the mechanical means 58 in controlling the reluctance of the magnetic circuit of the electromagnet 16.

Figure 4:
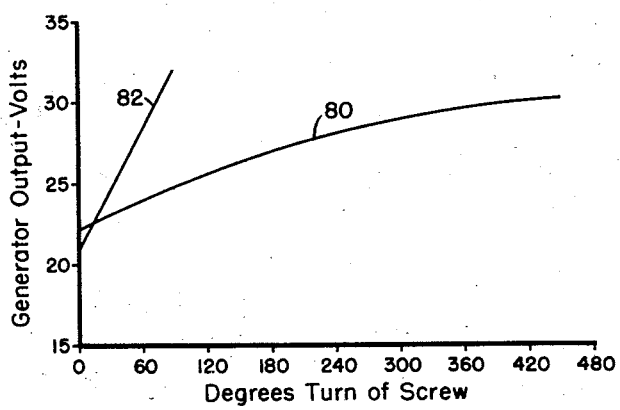
Fig. 4 is a graph in which the sensitivity of the means, illustrated in Fig. 1, for varying the reluctance of the magnetic circuit of the electromagnet, is compared to the sensitivity of a prior art device.
Figure 3:
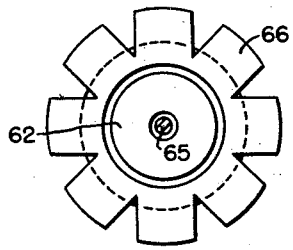
Fig. 3 is a sectional view taken along the line III—III of Fig. 1.

A comparison between the sensitivity of the mechanical means 58 and the sensitivity of the hereinbefore mentioned prior art method of varying the reluctance of the magnetic circuit of an electromagnet is illustrated in Fig. 4. A curve 80 illustrates the manner in which the output voltage of a generator (not shown) associated with the carbon pile regulator 10 varies with the adjustment of the screw member 65 of the mechanical means 58. On the other hand, a curve 82 illustrates the manner in which the output voltage of a generator (not shown) varies with a corresponding adjustment of the hereinbefore mentioned prior art means for varying the reluctance of the magnetic circuit of an electromagnet (not shown). As can be seen from the curves 80 and 82, the mechanical means 58 is far less sensitive than the corresponding prior art means.

Referring again to the armature and spring assembly 44, it can be seen that this assembly is disposed to cooperate with a support or ring member 84. In particular, a spring member 86, having a plurality of fingers 88, is disposed to pivot or turn about a ridge 90 of circular configuration and make substantially line contact engagement therewith so that a linear force-deflection characteristic is given to the spring member 86. More specifically, the fingers 88 of the spring member 86 pivot or turn about the ridge 90. The spring member 86 is likewise so disposed that it exerts a counterbalancing force against the non-linear force exerted by the electromagnet 16. The difference between the force exerted by the spring member 86 and the force exerted by the electromagnet 16 constitutes the regulating force for the pile regulator 10. This will be explained in greater detail hereinafter.

In order to effect damping during the operation of the electromagnet 16, a disc 92, preferably of thin steel that will readily saturate and not interfere with the magnetic circuit of the electromagnet 16, and a flexible diaphragm 94 preferably of copper are disposed in cooperative relationship with one another. As can be seen from Fig. 1 of the drawings, the disc 92, the diaphragm 94, the support ring 84, and the end pole piece 52 of the electromagnet 16 are all disposed between the flange 50 of the magnetic housing 46 and the section 40 and there held in assembled relationship by means of the screws 96.

For the purpose of holding the spring member 86 against a bottom spring retainer 98, an upper spring retainer or holding member 100 is provided. As illustrated, the holding member 100 so engages the spring member 86 that the spring member 86 pivots between the holding member 100 and the bottom retainer ring 98. As can be seen from Fig. 1 of the drawings, the holding member 100, the spring member 86, the bottom spring retainer 98, the diaphragm 94, and the armature member 47 of the electromagnet 16 are held in assembled relationship with respect to one another by means of a plurality of spaced screws 102.

In order to pivot the spring member 86 with respect to the holding member 100, an adjustable bushing 104 having an outwardly extending flange 106 is disposed in threaded engagement with the holding member 100. As illustrated, a connecting member 108, in this instance, a porcelain bushing, is disposed for receiving the movable pressure plate 20 and for seating against the adjustable bushing 104. The adjustable bushing 104 extends outwardly from the armature 47 through an opening 110 in the spring member 86, the flange 106 of the bushing 104 being disposed to apply a force to the edge of the central opening 110 of the spring member 86 in opposition to the holding member 100. Thus, by rotating the adjustable bushing 104 outwardly, the flange 106 applies a force to the edge of the central opening 110 of the spring member 86 to thereby pivot the spring member 86 with respect to the holding member 100 and thus change the loading on the spring member 100. The effect of such an adjustment can more clearly be understood by referring to Fig. 5.

Figure 5:
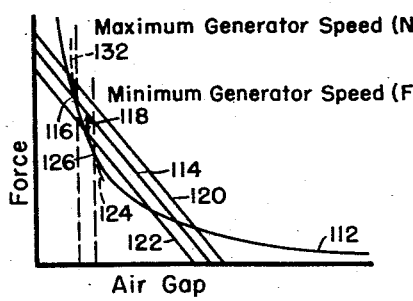
Fig. 5 is a graph, the curves of which illustrate the effect of applying a bias or load to the spring member, as illustrated in Fig. 1, in a predetermined manner, and the effect of preventing the further movement of the spring member towards the core member of the electromagnet, once it has reached a predetermined position.
Figure 9:
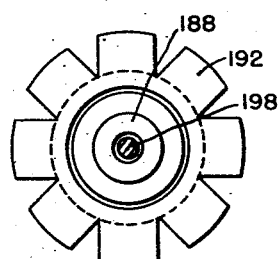
Fig. 9 is a sectional view of the apparatus illustrated in Fig. 8, taken along the line IX—IX.

Referring to Fig. 5, there is shown a plurality of curves illustrating the effect of rotating the adjustable bushing 104 of the spring and armature assembly 44. In particular, a curve 112, representing an adjusted position, illustrates the manner in which the force exerted by the electromagnet 16 varies with changes in the width of the air gap between the armature member 47 and the core member 45 of the electromagnet 16. On the other hand, a curve 114 represents the manner in which the force exerted by the spring member 86 varies with changes in the width of the air gap between the armature member 47 and the core member 45 of the electromagnet 16. As can be seen from Fig. 5, the curves 112 and 114 intersect at a point 116. When the curves 112 and 114 intersect at the point 116, a certain regulating force differential 118 is obtained for a given air gap between the armature member 47 and the core member 45. In order to obtain the desired regulating force differential 118 for the given air gap, it is oftentimes necessary to shift either the position of the curve representing the force exerted by the electromagnet 16 or the position of the curve representing the force exerted by the spring member 86. For instance, in order to shift the position of the curve 120, representing the force exerted by the spring member 86, until it assumes the position occupied by the curve 114, the adjusting bushing 104 is rotated so as to move the bushing 104 a predetermined distance towards the left to thereby decrease the loading on the spring member 86. On the other hand, a curve 122, representing the force exerted by the spring member 86, can be shifted until it assumes the position occupied by the curve 114, by rotating the bushing 104 so that it moves to the right, to thereby increase loading on the spring member 86. Thus, the force at any air gap position may be increased or decreased by means of the adjustable bushing 104 to thereby obtain a proper regulating force, such as represented by the force differential 118, for a given air gap between the armature member 47 and the core member 45 of the electromagnet 16.

As hereinbefore mentioned, the proper regulating force, such as the force differential 118, can be obtained by shifting the curve representing the force exerted by the electromagnet 16 until it assumes the adjusted position occupied by the curve 112. Such a shifting of the curve representing the force exerted by the electromagnet 16 is obtained by adjusting the position of the flux control member 62 of the mechanical means 58 with respect to the surface 69 of the recess 68. Thus, in operation, a predetermined portion of the flux produced by the current flow through the winding 56 of the electromagnet 16 flows through the restricted section 76 of the yoke 46 once the restricted section 76 becomes substantially saturated, the amount of the flux flowing through the restricted section 76 depending upon the thickness of the restricted section 76. Magnetic flux also flows across the air gap between the flux control member 62 and the surface 69 of the recess 68. The amount of magnetic flux passing across this air gap and the reluctance of the magnetic circuit of the electromagnet 16 is determined by the width of this air gap. Once the flux flows across the air gap between the flux control member 62 and the surface 69 of the recess 68, it flows radially outwardly in the flux control member 62, from whence it flows back to the base member 51 of the yoke 46. From there it flows through the side wall member 48, and the end pole piece 52, to the armature 47 of the electromagnet 16, and finally returns to the core member 45.

In order to obtain a proper functioning pile regulator 10, it is also necessary that the force-deflection curve of the stack 12 substantially coincide with the curve representing the force exerted by the electromagnet 16, such as the curve 112 illustrated in Fig. 5. In Fig. 5, the stack force-deflection curve is represented by a curve 124. The fact that the curve 124 does not coincide with the curve 112 at its lower portion is not important since regulation occurs between the intersecting point 116 and a point such as the point 126 on the curves 112 and 124.

In practice, the adjustable bushing 104 and the mechanical means 58, of the electromagnet 16, are adjusted to obtain the proper positioning of the curves 112 and 114 so that they intersect at the point 116. Then the stack adjusting screw 36 is adjusted until the stack force-deflection curve 124 substantially coincides with the curve 112, representing the force exerted by the electromagnet 16.

In order to change the slope of the upper portion of the curve 114, representing the force exerted by the spring member 86, an inner ridge 130 of circular configuration is provided on the support ring 84, as can be seen in Fig. 1. Thus, when the armature member 47 of the armature and spring assembly 44 is actuated a predetermined distance towards the core member 45 of the electromagnet 16, the spring member 86 engages the inner ridge 130 of the support ring 84 and this engaging portion of the spring member 86 is prevented from moving further in the same direction towards the core member 45. However, the armature member 47 is still permitted to move a further predetermined distance in the direction of the core member 45. However, in doing so the slope of the upper portion of the curve 114, as illustrated in Fig. 5, is changed. This portion of the curve 114 whose slope is changed by providing the inner ridge 130 is represented by the portion 132. Thus, it can be seen by referring to Fig. 5 that the force exerted by the electromagnet 16 is never permitted to overcome the force exerted by the spring member 86, when the inner ridge 130 of the support ring 84 is provided. For a more complete description of the carbon pile regulator to which this invention has been applied, reference may be had to application Serial No. 338,986, filed on February 26, 1953, and assigned to the same assignee as the subject application.

Figure 6:
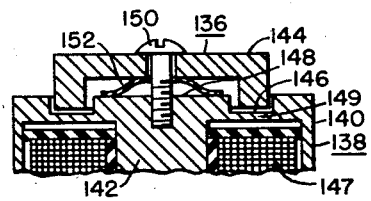
Fig. 6 illustrates another embodiment of the teachings of this invention in which a cup-shaped flux control member is disposed to control the reluctance of the magnetic circuit of an electromagnet.

Referring to Fig. 6, there is illustrated another embodiment of the teachings of this invention in which a different type of mechanical means 136 is provided for varying the reluctance of the magnetic circuit of an electromagnet 138, having a yoke 140, for a given positioning of the armature (not shown) of the electromagnet 138 with respect to its core member 142. The main distinction between the apparatus illustrated in Figs. 1 and 6 is that in the apparatus of Fig. 6 a cup-shaped flux control member 144 is provided instead of the cylindrical-shaped flux control member 62 illustrated in Fig. 1. Further, an annular-shaped recess 146 is disposed in the yoke 140 for receiving the flux control member 144.

In order to force the magnetic flux, produced by the current flow through a winding 147 disposed in inductive relationship with the core member 142, across the air gap between the flux control member 144 and the centrally disposed surface 148 of the yoke 140, a restricted section 149 is provided in the yoke 140. The restricted section 149 is disposed adjacent the air gap between the flux control member 144 and the surface 148. As was the case with the apparatus of Fig. 1, the thinner the restricted section 149, the more effective is the mechanical means 136 in controlling the relucance of the magnetic circuit of the electromagnet 138, which magnetic circuit includes the core member 142, the flux control member 144, the yoke 140, and the armature (not shown) of the electromagnet 138.

In operation, once the magnitude of the flux in the restricted portion 149 reaches a predetermined value, the restricted portion 149 becomes substantially saturated. Then flux, as produced by the current flow through the winding 147, is forced to pass over the air gap between the surface 148 of the yoke 140 and the flux control member 144, whence it flows radially outwardly through the flux control member 144 and thence passes to the yoke 140, and finally to the armature (not shown) of the electromagnet 138 and back to the core member 142. By adjusting a screw member 150 the width of the air gap between the surface 148 and the flux control member 144 can be varied, to thereby vary the reluctance of the magnetic circuit of the electromagnet 138 for a given position of its armature (not shown). In particular, when the width of the air gap between the surface 148 and the flux control member 144 is increased, the reluctance of the magnetic circuit of the electromagnet 138 is increased.

In the embodiment illustrated in Fig. 6, the width of the air gap between the flux control member 144 and the surface 148 of the yoke 140 is maintained at a substantially fixed value by means of a star-shaped spring-biasing member 152. The spring-biasing member 152 bears against the surface 148 of the yoke 140 and against the surface of the flux control member 144 to thereby prevent a rotation of the flux control member 144 during the operation of the pile regulator, and thus maintains a fixed value for the air gap between the flux control member 144 and the surface 148 during the operation of the apparatus.

Figure 7:
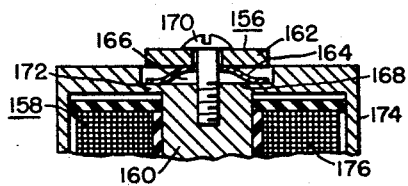
Fig. 7 illustrates a further embodiment of the teachings of this invention in which a cylindrical-shaped flux control member is disposed to vary the reluctance of the magnetic circuit of an electromagnet.

Referring to Fig. 7, there is illustrated still another type of mechanical means 156, which enables the reluctance of the magnetic circuit of an electromagnet 158 to be varied for a given position of the armature (not shown) of the electromagnet 158 with respect to its core member 160. The main distinction between the apparatus illustrated in Figs. 1 and 7 is that in the apparatus of Fig. 7 a cylindrical-shaped flux control member 162 is provided and a star-shaped spring-biasing member 164 is disposed in a cylindrical-shaped recess 166. As positioned, the spring-biasing member 164 bears against the flux control member 162 and against a surface 168 of the recess 166, to thereby maintain the width of the air gap between the flux control member 162 and the surface 168 of the recess 166 at a fixed value, once the flux control member 162 has been properly positioned by means of a screw member 170.

In order to force magnetic flux across the air gap between the flux control member 162 and the surface 168, a restricted section 172 is provided in the yoke 174 of the electromagnet 158. As was the case with the apparatus illustrated in Figs. 1 and 6, the sensitivity of the mechanical means 156 is determined by the thickness of the restricted section 172. In particular, the thinner the restricted section 172, the more sensitive is the mechanical means 156 in varying the reluctance of the magnetic circuit of the electromagnet 158. In operation, a predetermined portion of the flux produced by the current flow through a winding 176, disposed in inductive relationship with the core member 160, flows through the restricted section 172 of the yoke 174 to thereby substantially saturate the restricted section 172. Flux then flows across the air gap between the surface 168 and the flux control member 162, whence it flows radially outwardly in the flux control member 162, back into the yoke 174, then into the armature (not shown) of the electromagnet 158, and finally into the core member 160.

Figure 8:
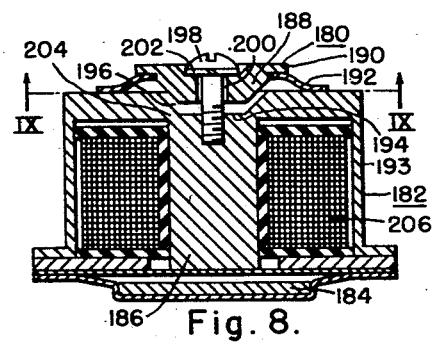
Fig. 8 illustrates a still further embodiment of the teachings of this invention in which a frusto-conical shaped flux control member is disposed to control the reluctance of the magnetic circuit of an electromagnet.

Referring to Fig. 8, there is illustrated still another type of mechanical means 180 for varying the reluctance of the magnetic circuit of an electromagnet 182 for a given position of its armature 184 with respect to its core member 186. In the embodiment of Fig. 8, the mechanical means 180 comprises a frusto-conical flux control member 188 having an outwardly extending flange member 190 on one end thereof, and a star-shaped spring-biasing member 192. The spring-biasing member 192 is disposed between the yoke 193 of the electromagnet 182 and the flange 190 of the flux control member 188, so as to prevent the flux control member 188 from rotating with respect to the yoke 193 during the operation of the apparatus, and so as to maintain an air gap of fixed value between the flux control member 188 and the surface 194 of a recess 196 which is disposed to receive the flux control member 188. As illustrated, the surface 194 is normal to the axis of the core member 186. In practice, the width of the air gap between the flux control member 188 and the surface 194 is varied by means of a screw member 198 which passes through a passageway 200 in the flux control member 188 and is threadedly engaged in the yoke 193 and in the core member 186.

In order to further ensure that the flux control member 188 does not rotate with respect to the yoke 193, during the operation of the apparatus, a lock washer 202 is disposed between the head of the screw member 198 and the surface of the flux control member 188. However, it is to be understood that the spring-biasing member 192 is the prime means for preventing rotation of the flux control member 188 with respect to the yoke 193 of the electromagnet 182, since it frictionally engages both the yoke 193 and the flange 190 of the flux control member 188.

In order to force flux across the air gap between the flux control member 188 and the surface 194, a restricted portion 204 is provided in the yoke 193 of the electromagnet 182. As was the case with the other embodiments illustrated, the sensitivity of the mechanical means 180 increases with a decrease in the thickness of the restricted section 204.

In operation, the current flow through a winding 206, disposed in inductive relationship with the core member 186, effects a flux, a predetermined portion of which for a given magnetomotive force flows through the restricted section 204 of the yoke 193. When the restricted section 204 substantially saturates, flux then passes across the air gap between the flux control member 188 and the surface 194 of the recess 196, whence it flows radially outwardly through the flux control member 188, then passes back to the yoke 193 where it flows through the yoke 193 to the armature member 184 of the electromagnet 182, and thence back to the core member 186.

The apparatus embodying the teachings of this invention has several advantages. For instance, since the means for varying the reluctance of the magnetic circuit of the electromagnet for a given positioning of its armature is not highly sensitive, a proper positioning of the force curve of the electromagnet can be readily obtained. In addition, once the mechanical means for varying the reluctance of the magnetic circuit has been adjusted, it remains in the same position, even though the carbon pile regulator is vibrating during its operation. Further, the magnetic housings for the electromagnets illustrated in the various embodiments and the various flux control members can be investment cast of a low silicon steel or of hipernik, thus reducing the overall cost of the apparatus. Also, it is not necessary to manufacture large diameter screw threads with close tolerances which are difficult to accurately produce.

Since certain changes may be made in the above apparatus and different embodiments of the invention could be made without departing from the scope thereof, it is intended that all matter contained in the above description or shown in the accompanying drawings shall be interpreted as illustrative and not in a limiting sense.

We claim as our invention:

1. In a pile regulator having a stack of resistance material and an electromagnet disposed for operation to control the pressure applied to the stack in accordance with the magnitude of an electrical quantity, the combination comprising, a core member for the electromagnet, a winding disposed in inductive relationship with the core member and responsive to the magnitude of the electrical quantity, a flux control member, a yoke associated with the core member, the yoke having a recess disposed therein for receiving the flux control member, means for adjusting the position of the flux control member with respect to a surface of the recess so as to provide an air gap, the width of which can be varied, between the flux control member and the surface of the recess, to thereby enable a variation in the reluctance of a magnetic circuit including the core member, the flux control member, and the yoke, the yoke having a restricted section adjacent said air gap which saturates when the flux density in the restricted section reaches a predetermined value, to thereby determine the proportion of the total flux that flows across said air gap for a given magnetomotive force as effected by the current flow through said winding, and an armature assembly responsive to the magnitude of the magnetomotive force as effected by the current flow through said winding and disposed to vary the pressure applied to the stack of resistance material in accordance with the magnitude of the magnetomotive force.

2. In a pile regulator having a stack of resistance material and an electromagnet disposed for operation to control the pressure applied to the stack in accordance with the magnitude of an electrical quantity, the combination comprising, a core member for the electromagnet, a winding disposed in inductive relationship with the core member and responsive to the magnitude of the electrical quantity, a flux control member having a passageway therethrough, a yoke associated with the core member, the yoke having a recess disposed therein for receiving the flux control member, means for adjusting the position of the flux control member with respect to a surface of the recess so as to provide an air gap, the width of which can be varied, between the flux control member and the surface of the recess, to thereby enable a variation in the reluctance of a magnetic circuit including the core member, the flux control member, and the yoke, said adjusting means including a screw member disposed in the passageway of the flux control member and threadedly engaging the electromagnet, and a spring biasing member disposed between the yoke and the flux control member for maintaining the width of the air gap between the surface of the recess in the yoke and the flux control member at a fixed value once the flux control member has been properly positioned by means of the screw member, the yoke having a restricted section adjacent said air gap which saturates when the flux density in the restricted section reaches a predetermined value, to thereby determine the proportion of the total flux that flows across said air gap for a given magnetomotive force as effected by the current flow through said winding, and an armature assembly responsive to the magnitude of the magnetomotive force as effected by the current flow through said winding and disposed to vary the pressure applied to the stack of resistance material in accordance with the magnitude of the magnetomotive force.

3. In a pile regulator having a stack of resistance material and an electromagnet disposed for operation to control the pressure applied to the stack in accordance with the magnitude of an electrical quantity, the combination comprising, a core member for the electromagnet, a winding disposed in inductive relationship with the core member and responsive to the magnitude of the electrical quantity, a flux control member having a radially extending flange on one end thereof and a passageway extending axially therethrough, a yoke associated with the core member, the yoke having a recess disposed therein for receiving the flux control member, means for adjusting the position of the flux control member with respect to a surface of the recess so as to provide an air gap, the width of which can be varied, between the flux control member and the surface of the recess, to thereby enable a variation in the reluctance of a magnetic circuit including the core member, the flux control member, and the yoke, said adjusting means including a screw member disposed in the passageway of the flux control member and threadedly engaged in the electromagnet, and a spring-biasing member disposed between the yoke and the radially extending flange of the flux control member for maintaining the width of the air gap between the surface of the recess in the yoke and the flux control member at a fixed value once the flux control member has been properly positioned by means of the screw member, the yoke having a restricted section adjacent said air gap which saturates when the flux density in the restricted section reaches a predetermined value, to thereby determine the proportion of the total flux that flows across said air gap for a given magnetomotive force as effected by the current flow through said winding, and an armature assembly responsive to the magnitude of the magnetomotive force as effected by the current flow through said winding and disposed to vary the pressure applied to the stack of resistance material in accordance with the magnitude of the magnetomotive force.

4. In a magnetic device in which the reluctance of a magnetic circuit can be varied, the combination comprising a magnetic member comprising a predetermined portion of the magnetic circuit, means for establishing a magnetic field in the magnetic member, a flux control member, comprising another predetermined portion of the magnetic circuit, the magnetic member having a recess disposed therein for receiving the flux control member, means for adjusting the position of the flux control member with respect to a surface of the recess so as to provide an air gap, the width of which can be varied, between the flux control member and the surface of the recess, to thereby enable a variation in the reluctance of the magnetic circuit, the magnetic member having a restricted section adjacent said air gap which saturates when the flux density in the restricted section reaches a predetermined value, to thereby determine the proportion of the total flux that flows across said air gap for a given magnetomotive force.

5. In a magnetic device in which the reluctance of a magnetic circuit can be varied, the combination comprising, a magnetic member comprising a predetermined portion of the magnetic circuit, means for establishing a magnetic field in the magnetic member, a flux control member having a passageway therethrough and comprising another predetermined portion of the magnetic circuit, the magnetic member having a recess disposed therein for receiving said flux control member, means for adjusting the position of the flux control member with respect to a surface of the recess so as to provide an air gap, the width of which can be varied, between the flux control member and the surface of the recess, to thereby enable a variation in the reluctance of the magnetic circuit, said adjusting means including a screw member disposed in the passageway of the flux control member and threadedly engaged in the magnetic member, and a spring-biasing member disposed between the flux control member and the magnetic member for maintaining the width of the air gap between the surface of the recess and the flux control member at a fixed value once the flux control member has been properly positioned by means of the screw member, the magnetic member having a restricted section adjacent said air gap which saturates when the flux density in the restricted section reaches a predetermined value, to thereby determine the proportion of the total flux that flows across said air gap for a given magnetomotive force.

6. In a magnetic device in which the reluctance of a magnetic circuit can be varied, the combination comprising, a magnetic member comprising a predetermined portion of the magnetic circuit, means for establishing a magnetic field in the magnetic member, a flux control member having a radially extending flange on one end thereof and a passageway extending axially therethrough, the flux control member comprising another predetermined portion of the magnetic circuit, the magnetic member having a recess disposed therein for receiving said flux control member, means for adjusting the position of the flux control member with respect to a surface of the recess so as to provide air gap, the width of which can be varied, between the flux control member and the surface of the recess, to thereby enable a variation in the reluctance of the magnetic circuit, said adjusting means including a screw member disposed in the passageway of the flux control member and threadedly engaged in the magnetic member, and a spring-biasing member disposed between the radially extending flange of the flux control member and the magnetic member for maintaining the width of the air gap between the surface of the recess and the flux control member at a fixed value once the flux control member has been properly positioned by means of the screw member, the magnetic member having a restricted section adjacent said air gap which saturates when the flux density in the resctricted section reaches a predetermined value to thereby determine the proportion of the total flux that flows across said air gap for a given magnetomotive force.

References Cited in the file of this patent

UNITED STATES PATENTS

| | | |
|---|---|---|
| 1,194,132 | Brown | Aug. 8, 1916 |
| 1,939,870 | Wike | Dec. 19, 1933 |
| 2,227,486 | Campbell | Jan. 7, 1941 |
| 2,549,371 | Fereday | Apr. 17, 1951 |